United States Patent [19]

Hayashi et al.

[11] Patent Number: 5,312,614
[45] Date of Patent: May 17, 1994

[54] METHOD FOR PRODUCING WHITE ELECTRICALLY CONDUCTIVE ZINC OXIDE

[75] Inventors: Takao Hayashi; Norihiro Sato; Chikara Omotani, all of Shimonoseki; Manabu Hosoi, Omiya; Nobuyoshi Kasahara, Sayama, all of Japan; Günther Rudolph, Neuberg, Fed. Rep. of Germany; Wolf-Dieter Griebler, Moers, Fed. Rep. of Germany; Jörg Hocken, Dusseldorf, Fed. Rep. of Germany

[73] Assignee: Metallgesellschaft Aktiengesellschaft, Frankfurt am Main, Fed. Rep. of Germany

[21] Appl. No.: 538,255

[22] Filed: Jun. 14, 1990

[30] Foreign Application Priority Data

Jun. 21, 1989 [JP] Japan .................................. 156650

[51] Int. Cl.$^5$ ........................ C01G 9/02; C04B 14/30; C09C 1/04; H01B 1/08
[52] U.S. Cl. .................................... 423/622; 106/425; 106/426; 252/518
[58] Field of Search ............... 106/425, 426; 423/622; 252/518

[56] References Cited

U.S. PATENT DOCUMENTS

| | | | |
|---|---|---|---|
| 1,982,604 | 6/1929 | Barfuss | 423/622 |
| 3,515,686 | 6/1970 | Bowman | 106/426 |
| 3,538,022 | 11/1970 | Bowman | 106/425 |
| 5,102,650 | 4/1992 | Hayashi | 106/425 |
| 5,110,586 | 5/1992 | Kurihara | 106/426 |
| 5,171,364 | 12/1992 | Sato | 106/425 |

FOREIGN PATENT DOCUMENTS

| | | | |
|---|---|---|---|
| 0317272 | 5/1989 | European Pat. Off. | 423/622 |
| 7247238 | of 1968 | Japan | 423/622 |
| 0005324 | 1/1981 | Japan | 423/622 |
| 0149827 | of 1982 | Japan | 106/425 |
| 0061631 | 4/1982 | Japan | 423/622 |
| 0092340 | 5/1984 | Japan | 423/622 |

OTHER PUBLICATIONS

74–Radiation Chem. Photochem. vol. 101, 1984–No. Sho 58–161923.
76–Electric Phenomena, vol. 99, 1983–No. 58–145620.
Chem. Absts. vol. 101, 1984–No. 59–97531.
Chem. Absts. vol. 105, 1986–No. 61–40338, 49–Industrial Inorganics, vol. 105, 1986; No. 61–86421.
74–Radiation Chem. Photochem. vol. 93, 1980–79,161,598.
Japan Kokai Tokkyo Koho–81–69,266.
Japan Kokai Tokkyo Koho 80,162,477.

*Primary Examiner*—Paul Lieberman
*Assistant Examiner*—John Boyd
*Attorney, Agent, or Firm*—Felfe & Lynch

[57] ABSTRACT

A method is provided for the high yield production of white, electrically conductive zinc oxide which comprises the simultaneous addition to a reactor of (1) an aqueous solution containing a water-soluble zinc compound and at least one water-soluble compound of a metal selected from the group consisting of tin, aluminum, gallium and indium, and (2) an aqueous alkaline solution, while maintaining the resulting neutralization reaction solution at a pH from 6 to 12.5 to obtain coprecipitates, and then calcining the coprecipitates in a reducing atmosphere to obtain said conductive zinc oxide.

8 Claims, 2 Drawing Sheets

METHOD FOR PRODUCING WHITE ELECTRICALLY CONDUCTIVE ZINC OXIDE

FIELD OF THE INVENTION

The present invention relates to a method for producing electrically conductive zinc oxide, which is excellent in whiteness, in a high yield. More specifically, the present invention pertains to a method for producing white, electrically conductive zinc oxide for use in applications such as a conductive coating agent in making electrostatic recording paper and as a conductive filler used in antistatic paints, rubbers and resins.

BACKGROUND OF THE INVENTION

A variety of methods for producing electrically conductive zinc oxide are known. For instance, Japanese Patent Laid Open Corresponding to OLS in Germany (hereunder referred to as "J.P. KOHKAI") Nos. Sho 58-161923, Sho 58-145620, Sho 55-162477, Sho 59-97531, Japanese Patent Publication corresponding to Auslege in Germany (hereinafter referred to as "J.P. KOHKOKU") No. Sho 55-19897 and U.S. Pat. No. 3,538,022 disclose methods which comprise adding to zinc oxide powder an oxide of at least one metal selected from the group consisting of aluminum, gallium, indium, tin and the like as a dopant to admix them and then heating the mixture at a temperature ranging from 600° C. to 1200° C. In addition, there are also dry methods which are known such as those comprising heating a mixture of zinc oxide powder and a dopant in the presence of solid carbon to calcine the mixture; wet methods such as those disclosed in J.P. KOHKAI Nos. Sho 62-35970, Sho 61-86421 and Sho 61-40338, which comprise neutralizing a mixture of a solution of a water-soluble zinc compound and a solution of a water-soluble compound of the aforesaid metals with an aqueous solution of an alkali hydroxide or an alkali carbonate or the like to form co-precipitates and heating and calcining the co-precipitates at a temperature of 500° C. to 1000° C. in nitrogen atmosphere or in a reducing atmosphere after washing, drying or preheating the coprecipitates; and the like.

However, in order to impart sufficient electric conductivity to a calcined product a dry method is necessary to perform calcination at an elevated temperature under a reducing atmosphere. This is accompanied by volatilization of zinc oxide due to reduction. Consequently, the yield of the desired product is lowered remarkably. Moreover, there is sometimes observed secondary sintering of the products during the high temperature calcining step.

On the other hand, in all of the conventional wet methods for producing electrically conductive zinc oxide, neutralization is performed in a batchwise operation. More specifically, an aqueous solution of an alkali hydroxide or an alkali carbonate is gradually added to an aqueous solution of a water-soluble compound of zinc and a water-soluble compound of a metal as a dopant so that a final pH of the reaction system falls within the range within which zinc and the like cause precipitation. In such a method, pH at the beginning of the neutralization differs from that at the final stage. Therefore, it is difficult to coprecipitate two or more of products having different rates of hydrolysis or rates of dissolution in a desired ratio so as to achieve a homogeneous distribution of the production in the solid phase. Accordingly, to impart a desired degree of electric conductivity to the resulting product, calcination is inevitably carried out under a reducing condition at an elevated temperature. However, as set out above, such a calcination at an elevated temperature is accompanied by lowering of product yield as a result of volatilization of zinc oxide. Furthermore, the reducing atmosphere in which the calcination is carried out exerts influence on the product to thus cause partial reduction of the resulting metal oxide, which in turn is accompanied by deposition of metals in a trace amount. This causes the lowering in whiteness of the resultant calcined product.

Accordingly, an object of the present invention is to provide a method for producing calcined products having a desired electrical conductivity with low temperature calcination.

SUMMARY OF THE INVENTION

In accordance with the present invention an improved wet method for producing white, electrically conductive zinc oxide powder is provided which solves the problems which have heretofore remained unsolved by the aforementioned conventional methods. In particular, it has been found that the coprecipitates serving as a starting material for calcination should have homogeneous compositional distribution to obtain calcined products having practical and acceptable electric conductivity with low temperature calcination. The homogeneity of this compositional distribution is confirmed by analyzing X-ray diffraction spectra of the co-precipitates.

According to the present invention, co-precipitates showing homogeneous compositional distribution, in other words, coprecipitates in which a compound of a metal serving as a dopant is homogeneously distributed throughout the solid phase of zinc oxide, are obtained by simultaneously adding to a reactor;

(i) an aqueous solution containing a water-soluble compound of zinc and a water-soluble compound of at least one metal selected from the group consisting of tin, aluminum, gallium and indium and;

(ii) an aqueous alkaline solution, wherein the addition of solutions (i) and (ii) is performed while controlling the pH value of the water phase of the reaction system to a desired value falling within the range of from 6 to 12.5, and preferably from 7 to 12. The precipitates are then dried and calcined in a reducing atmosphere to produce white, electrically conductive zinc oxide.

DETAILED DISCUSSION OF THE INVENTION

Figure 1A:
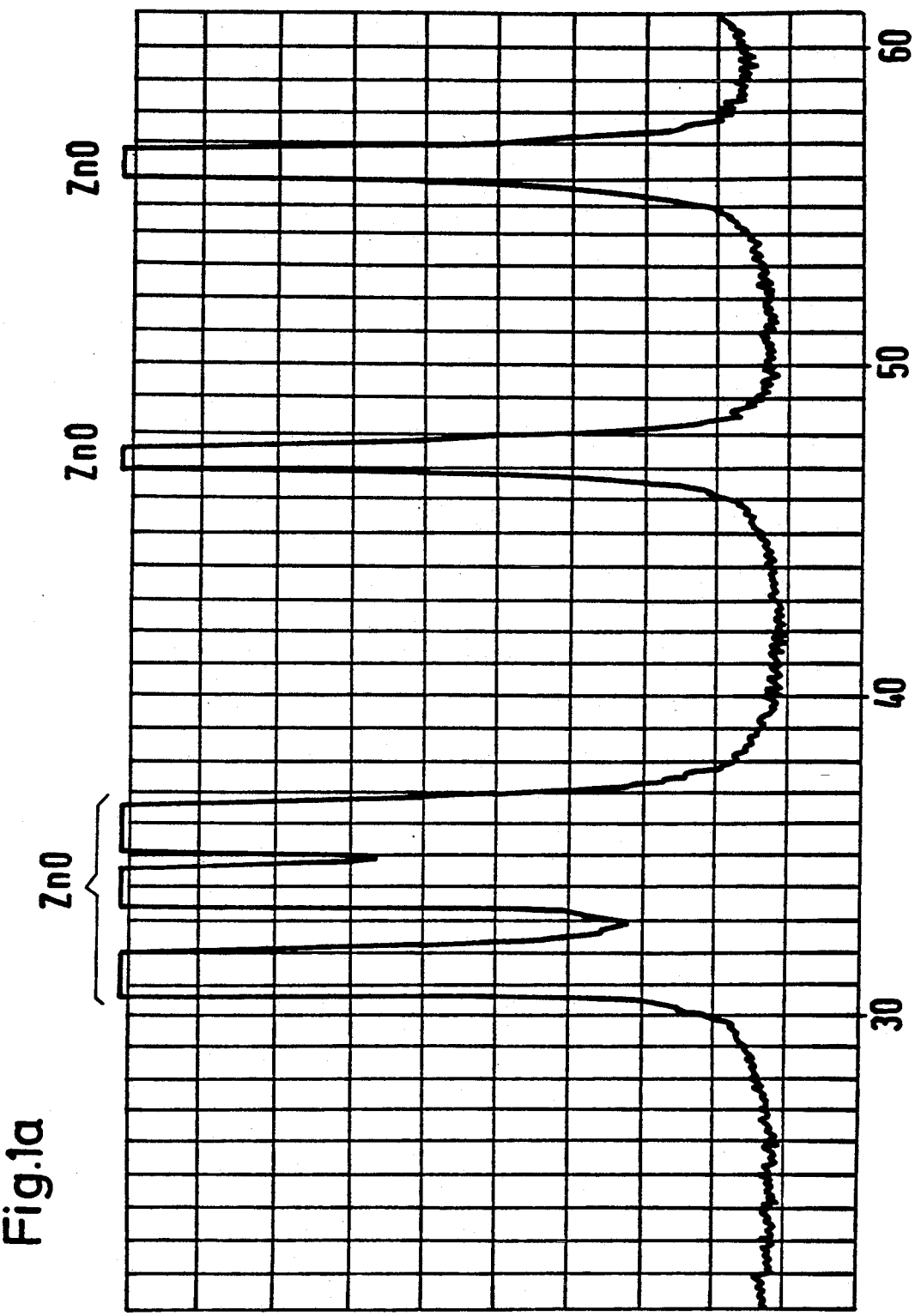
FIGS. 1(a) and 1(b) are X-ray diffraction patterns which illustrate the present invention.

In the method of the present invention, the term "simultaneous addition" also embraces the continuous addition or intermittent addition of the solution containing the zinc compounds and the compounds of other metals defined above and the aqueous alkaline solution so as to maintain the pH value of the liquid phase of the neutralization reaction system to a desired value falling within the predetermined range.

The amount of each component contained in each solution is expressed in the amount to the corresponding oxide based on the composition of the oxidized product obtained after calcination, and is selected so that the amount of at least one metal oxide selected from the group consisting of tin oxide, gallium oxide, indium oxide and aluminum oxide ranges from 0.005 to 5.0 parts by weight, preferably 0.005 to 2.0 parts by weight, to 100 parts by weight of zinc oxide. In this respect, if the dopant comprises two or more of the foregoing metal oxides, the total amount of these oxides should range from 0.005 to 5.0 parts by weight, preferably 0.005 to 2.0 parts by weight.

The homogeneous co-precipitates thus formed are filtered, then washed with water to remove impurity ions to as low a level as possible and dried usually at a temperature ranging from 80° C. to 150° C. If the resulting dried precipitates are calcined at a temperature of as low as 400° C. to 550° C., preferably 400° C. to 500° C., in a reducing atmosphere including hydrogen gas, the lowering in whiteness of the calcined product is not observed and the calcined product can be obtained in a high yield. Although the calcined product is obtained according to low temperature calcination, it has a practical and acceptable low electric resistance on the order of $10^{-1}$ to $10^2$ ohm.cm.

The water-soluble zinc compounds which may be used in the present invention are not restricted to specific ones so far as they provide zinc oxides through calcination. Preferred examples thereof are zinc sulfate, zinc chloride, zinc nitrate, zinc acetate or a mixture thereof since such compounds are easily commercially available.

The water-soluble metal compounds serving as a dopant are not also restricted to specific ones so far as they can provide tin oxide, gallium oxide, indium oxide or aluminum oxide through calcination. From the practical view point, usually employed are at least one chloride, nitrate, sulfate and acetate precursor of the metals constituting the foregoing oxides as well as at least one alkali metal salt of oxo acids of these metals, i.e., stannic acid, gallium acid, indium acid and aluminic acid.

These dopants provide acceptable effects if they are used alone, but more preferable effects can be achieved if they are used in combination with at least two of them (combined addition). Examples of such preferred combinations include tin oxide/gallium oxide, tin oxide/indium oxide, or aluminum oxide/gallium oxide as expressed in oxides.

The pH value of an aqueous solution in which zinc ions and metal ions of the dopant coexist is usually adjusted up to 1.0 to avoid hydrolysis prior to the reaction with the alkali. The concentration of the metal ions in the solutions is not restricted to a specific one so far as it does not exceed the solubility thereof, but from a practical point of view it is preferred that the metal ion concentration be in the range of from 200 to 500 g/l in a system in which zinc ions and dopant metal ions coexist.

Examples of alkali meal hydroxides or alkali metal carbonates which are principal components of the alkaline aqueous solution used in the neutralization reaction include sodium hydroxide (caustic soda), potassium hydroxide (caustic potash), ammonium hydroxide (ammonia), sodium carbonate (soda ash), sodium hydrogen carbonate (sodium bicarbonate) and ammonium carbonate. These compounds may be used alone or in combination and are usually used in the form of an aqueous solution.

The most important aspect of the present invention resides in the combination of the following two requirements:

Requirement-1: The neutralization reaction of the aqueous water-soluble zinc and water-soluble metal compound solution with the alkaline solution is performed so that the pH value of the neutralization system is maintained within the range of from 6 to 12.5, and preferably from 7 to 10; and Requirement-2: The aqueous solution containing the water-soluble zinc and water-soluble metal compound and the alkaline solution are added simultaneously to a neutralization reaction system to maintain the aforesaid pH range.

The significance of the requirement-1 is as follows:

If the pH value is less than 6, the hydrolysis of the water-soluble zinc compound is insufficient and, therefore, not only the yield of the final product is decreased but also the reaction provides products having high content of impurity, i.e., low quality due to the formation of basic salts as by-products.

On the other hand, if the pH value greatly exceeds 12.5, the electric conductivity of the resultant product is insufficient, or in other words, it does not reach a desired level. This is because the hydrolysis of the dopant remains insufficient under such a condition.

If the pH value is controlled to a value falling within the foregoing range, the formation of basic salts can be completely prevented or only a trace amount thereof is formed. Accordingly, almost all the amount of the resulting precipitates can be converted to zinc oxide even if the precipitates are dried at a lower temperature condition on the order of ordinary temperature to 150° C. However, in conventional methods, the precipitates obtained cannot be sufficiently converted to zinc oxide when the precipitates are dried at such a low temperature. As a counter measure of this problem, preheating has been performed at much higher temperatures of from 400° C. to 700° C. in the air prior to calcination in a reducing atmosphere. Moreover, a substantial amount of water vapor is generated during the calcination in a reducing atmosphere and hence a large amount of hydrogen is consumed in such conventional methods.

The significance of the requirement-2 is as follows:

If both of the solutions are simultaneously added to the neutralization reaction system, selective hydrolysis of the dopant can be prevented.

The formation of co-precipitates having homogeneous compositional distribution can be ensured by co-precipitating water-insoluble or substantially water-insoluble compounds formed from both of zinc and the metal in the dopant simultaneously, homogeneously and continuously (as is confirmed by analysis of X-ray diffraction patterns).

The significance of the combination of these two requirements is as follows:

Supplementary examination indicates that instead of white, electrically conductive powder such as obtained by the present inventive process, gray colored powder is obtained according to the technique disclosed in J. P. KOHKAI No. Sho 61-86421. This method discloses neither the simultaneous addition of the aqueous solution of the zinc compound and a dopant and an aqueous solution of an alkali, nor the fact that the reaction is performed while controlling the pH value of the neutralization reaction system at a desired value falling within the range of from 6 to 12.5. Moreover, the drying operation of the resulting precipitates is carried out at an elevated temperature on the order of 400° C. or 500° C. which is almost equal to the calcination temperature. Further, the calcination in a reducing atmosphere is performed at a temperature of 700° C. which is substantially higher than the upper limit of the calcination temperature used in the present invention. The present invention therefore surprisingly and unexpectedly succeeds in providing a method capable of imparting practical and acceptable electrical conductivity to calcined products even if the calcination is performed at a temperature as low as 400° C. to 500° C. It is of much importance that the method of this invention can also achieve the enhancement of yield of calcined products as well as the improvement in whiteness thereof (prevention of darkening).

The co-precipitates formed through the neutralization reaction comprising the combination of the aforesaid requirement-1 with requirement-2 can be filtered off using conventional methods, followed by washing the precipitates with water until the electrical conductivity of the filtrate becomes at most 300 $\mu$ S/cm, and then drying the precipitates at a temperature ranging from ordinary temperature to 150° C. followed by calcining the dried precipitates without previous pulverization, at a temperature from 400° C. to 550° C., preferably from 400° C. to 500° C., in a reducing atmosphere containing hydrogen gas.

The product obtained through calcination under a reducing atmosphere is very fragile and, therefore, can easily be formed into fine powder. Since, in the present invention, the calcination is performed at a very low temperature of as low as 400° C. to 550° C., volatilization of zinc oxide due to the reduction is very small and hence electrically conductive zinc oxide can be obtained in a high yield. The specific volume resistivity of the white electrically conductive zinc oxide powder obtained according to the method of this invention is usually in the range of from $10^{-1}$ to $10^2$ ohm.cm and is very stable to the extent that it hardly varies with time. In most cases, the powder is obtained in the form of approximately spherical shape having an average particle size ranging from about 0.05 to about 0.5 micron.

The method of the present invention is more fully however, illustrated by the following examples. It is to be understood, however, that these examples are intended for illustrative purposes only, and are not intended to limit the scope of this invention or the claims in any way.

EXAMPLE 1

11.17 kg. of zinc chloride (96%), 71.67 g of tin (IV) chloride (98% in purity) (the ratio of addition being 0.593% expressed in the amount of $SnO_2$ based on the weight of the zinc oxide) and 64.72 g of gallium chloride (99.9% in purity) (the ratio of addition being 0.545% expressed in the amount of $Ga_2O_3$ based on the weight of the zinc oxide) were dissolved in water and 400 ml of 36% hydrochloric acid to obtain 15 liters of a solution A. The solution A and an NaOH solution (240 g/l in concentration, solution B, were then simultaneously fed to a reaction system over 180 minutes while maintaining the pH value of the reaction solution at 10 and the reaction temperature at 60° C. to thus obtain co-precipitates. The resulting co-precipitates were filtered off in an ordinary manner, then washed with water until the electric conductivity of the filtrate of washing liquid became at highest 300 $\mu$ S/cm and were dried at 105° C. in air. The resultant block-like product (about 2 to 30 mm in size) as such was calcined at a temperature of 500° C. for 60 minutes in hydrogen gas atmosphere to thus obtain 6.3 kg of white, electrically conductive zinc oxide powder. The powder resistivity of the resultant product was $1.8° \times 10°$ ohm.cm.

Moreover, the fact that the percentage loss in weight observed during calcination became a value as low as 2% indicates that the precipitates were almost completely converted into zinc oxide during drying.

In this respect, the homogeneity of the compositional distribution of the foregoing dried block was confirmed by X-ray diffraction measurement performed prior to the calcination. The results obtained are illustrated in FIG. 1(a).

The conventional batchwise neutralization of the solution A with the solution B was carried out in the same manner as in the Example-1 to bring the final pH value of the solution to 10, and a dried block obtained which was analyzed by X-ray diffraction. The results are shown in FIG. 1(b) for purposes of comparison.

In FIG. 1(a), only the diffraction line of zinc oxide is observed while no diffraction line due to tin oxide or gallium oxide which may possibly co-exist is observed.

Figure 1B:
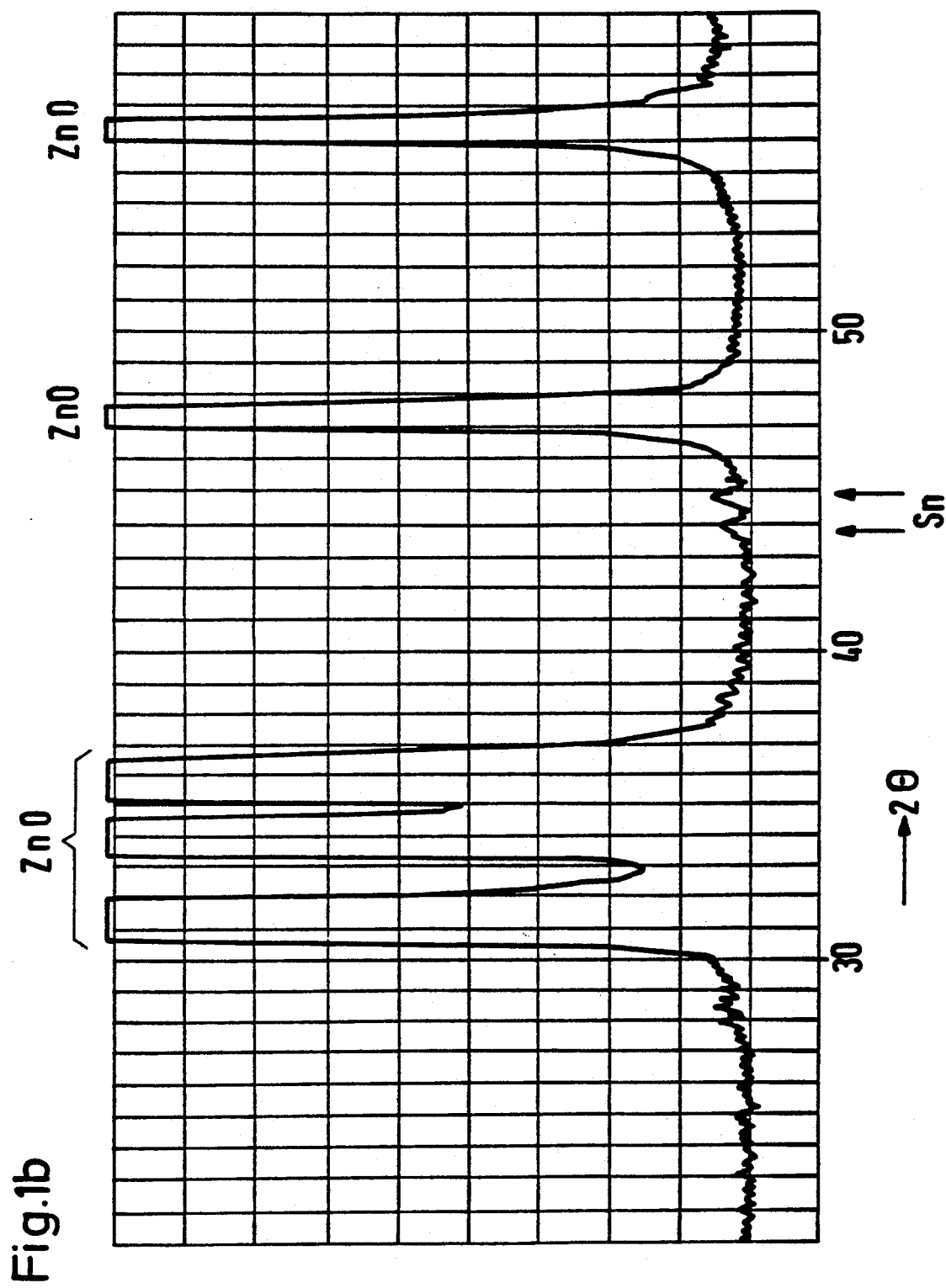

On the other hand, in FIG. 1(b), there are observed diffraction lines due to metallic tin between the diffraction lines of zinc oxide (in the vicinity of $2\theta = 43.8°$ and 44.8°). The results are summarized in Table 1 below.

It can be concluded that the diffraction lines due to tin oxide or gallium oxide are not observed in FIG. 1(a), since tin oxide or gallium oxide is homogeneously distributed throughout the zinc oxide lattice.

It can also be interpreted that the diffraction lines are observed in FIG. 1(b) because a part of tin oxide deposited on the surface of zinc oxide is reduced to metallic tin. This interpretation is also supported by the fact that the resultant product showed dark gray appearance.

The content of chlorine atom in the calcined product produced in accordance with the present invention was quite low, i.e., 0.01%. The change in the powder resistivity of the electrically conductive zinc oxide powder in the air was then determined to evaluate storage stability (change with time) thereof. The results thus obtained indicate that the electrically conductive zinc oxide powder of the present invention is very stable as shown below in table 1(a) (see also Table 1).

TABLE 1(a)

| days from the beginning: | 10 | 30 | 120 |
|---|---|---|---|
| powder resistivity (Q cm): | $5.4 \times 10°$ | $5.2 \times 10°$ | $4.3 \times 10°$ |

EXAMPLE 2

The same procedure as in Example 1 were repeated except that the neutralization was carried out so as to maintain the pH value of the liquid phase of the reaction system at 12 to thus obtain 6.25 kg of white, electrically conductive zinc oxide powder. The powder resistivity thereof was $4.0 \times 10°$ ohm.cm. The results obtained are summarized in Table I below.

EXAMPLE 3

Various white, electrically conductive zinc oxide powders were prepared according to the same procedure as in Example 1 except that the kinds of the water-soluble zinc compounds, the kinds and the amount of dopants, the kinds of alkalis, pH values of reaction systems and calcination temperatures utilized were varied. The conditions and the results obtained are summarized in the Table I below.

COMPARATIVE EXAMPLE 1

There were dissolved 52.34 g of zinc chloride (96%), 0.95 g of tin chloride (98%) and 0.47 g of aluminum chloride (95%) in 1.2-liter of water and 37.80 g of sodium carbonate (99.7%) was added to the solution in one portion with sufficiently stirring the system to perform a neutralization reaction.

TABLE I

| | | | (Example) | | | | | | | | | | |
|---|---|---|---|---|---|---|---|---|---|---|---|---|---|
| | | | Dopant | | | Reaction System | | Drying | Calcination | | | Product | |
| Ex. No. | Zinc Compound | Alkali | Combination | | Ratio of Addition % % | Temp. (°C.) | pH | Temp. °C. | Temp. °C. | Atmosphere | Time min. | Yield % | Electric Conductivity (Ω·cm) | Color |
| 1 | ZnCl₃ | NaOH | SnO₃ | Ga₂O₃ | 0.593 0.545 | 60 | 10 | 105 | 500 | H₂ | 60 | 98 | $1.8 \times 10^0$ | White |
| 2 | " | " | " | " | " " | " | 12 | " | " | " | " | 97.5 | $4.0 \times 10^0$ | " |
| 3-1 | " | " | " | " | 0.500 0.400 | " | 7 | " | " | " | " | 99 | $1.2 \times 10^0$ | " |
| 3-2 | " | " | " | " | " " | " | 8 | " | " | " | " | " | $5.0 \times 10^0$ | " |
| 3-3 | " | " | " | " | " " | " | 9 | " | " | " | " | 98 | $7.3 \times 10^0$ | " |
| 3-4 | " | " | " | " | 0.005 0.005 | " | " | " | " | " | " | " | $5.1 \times 10^0$ | " |
| 3-5 | " | " | " | " | 0.010 0.010 | " | " | " | " | " | " | " | $2.8 \times 10^0$ | " |
| 3-6 | " | " | " | " | 0.020 0.020 | " | " | " | " | " | " | " | $4.2 \times 10^0$ | " |
| 3-7 | " | " | " | " | 0.200 0.050 | " | " | " | " | " | " | " | $2.1 \times 10^0$ | " |
| 3-8 | " | " | " | " | 0.500 0.400 | " | " | " | 400 | " | " | 99 | $7.4 \times 10^{-1}$ | " |
| 3-9 | " | " | " | " | " " | " | " | " | 450 | " | " | " | $7.6 \times 10^{-1}$ | " |
| 3-10 | " | " | " | " | 0.200 0.050 | " | " | " | 400 | " | " | " | $2.8 \times 10^0$ | " |
| 3-11 | " | " | " | " | " " | " | " | " | 450 | " | " | " | $1.5 \times 10^0$ | " |
| 3-12 | " | " | " | " | " " | " | " | " | 550 | " | " | 96 | $2.5 \times 10^0$ | " |
| 3-13 | ZnCl₃ | Na₂CO₃ | " | " | 0.500 0.400 | " | 6 | " | 500 | " | " | 96 | $4.7 \times 10^1$ | " |
| 3-14 | " | NH₄OH | " | " | 0.200 0.050 | " | 6 | " | " | " | " | 86 | $3.7 \times 10^0$ | " |
| 3-15 | ZnSO₄ | NaOH | " | " | " " | " | 8 | " | " | " | " | 98 | $3.2 \times 10^1$ | " |
| 3-16 | " | Na₂CO₃ | " | " | " " | " | 6 | " | " | " | " | 96 | $3.7 \times 10^1$ | " |
| 3-17 | " | NH₄OH | " | " | " " | " | 7 | " | " | " | " | 88 | $8.7 \times 10^1$ | " |
| 3-18 | ZnCl₃ | NaOH | — | " | " 0.200 | " | 7 | " | " | " | " | 98 | $5.9 \times 10^1$ | " |
| 3-19 | " | " | — | " | " 0.050 | " | " | " | " | " | " | 98 | $7.5 \times 10^1$ | " |
| 3-20 | " | Na₂CO₃ | Al₂O₃ | " | 0.500 0.500 | " | 6.5 | " | " | " | " | 96.5 | $9.6 \times 10^1$ | " |
| 3-21 | " | " | " | In₂O₃ | 1.000 0.300 | " | 6.5 | " | " | " | " | 96 | $7.1 \times 10^1$ | " |

The deposited basic zinc carbonate co-precipitates containing aluminum and tin were introduced into a closely sealed container to adjust the slurry concentration to 300 g/l; the contents of the container were heat-treated at 80° C. for 5 hours, followed by filtering off, washing and drying the resulting precipitates. The dried co-precipitates were calcined at 700° C. for 3 hours in hydrogen gas atmosphere to obtain dark gray electrically conductive zinc oxide powder. Its powder resistivity was $4.2 \times 10^1$ ohm.cm and the yield of the product was 55.7%. The results are summarized below in Table II.

COMPARATIVE EXAMPLE 2

There were dissolved 52.34 g of zinc chloride (96%), 0.96 g of tin (IV) chloride (98%) and 0.48 g of aluminum chloride (95%) in 1.26 liter of water and 195 cc of an aqueous solution containing 0.217 g of gallium chloride (99.9%), 0.91 g of sodium hydroxide and 37.42 g of sodium carbonate (99.7%) was added to the solution in one portion while sufficiently stirring the system to perform a neutralization reaction. The co-precipitates formed were filtered off, washed with 3 liters of warm water and were introduced into a closely sealed container to adjust the slurry concentration to 300 g/l. The contents of the container were then heat-treated at 80° C. for 5 hours, followed by again filtering off the co-precipitates, again washing the same and drying them at 500° C. for 3 hours. The dried co-precipitates were calcined at 700° C. for 3 hours in hydrogen gas atmosphere to obtain dark gray electrically conductive zinc oxide powder. Its powder resistivity was $1.1 \times 10^1$ ohm.cm and the yield of the product was 58.6%. The results are summarized in Table II below.

COMPARATIVE EXAMPLE 3

There were dissolved in 296 ml of water, 52.34 g of zinc chloride (96%) and 4.20 g of aluminum chloride (95%). To the resulting solution there was gradually added 166 ml of 14% aqueous ammonia with stirring the solution at room temperature to raise the pH value of the liquid phase to 8.2. After the completion of the addition, the reaction system was stirred for additional several minutes, followed by filtering off the resultant co-precipitates, washing the same and drying them at 100° C. for 15 hours. After preheating the precipitates at 450° C. for 1 hour in the air, the solid material of the precipitates were pulverized. The pulverized product was calcined at 800° C. for one hour in nitrogen gas atmosphere to obtain white powder mainly composed of zinc oxide. The powder resistivity thereof was not less than $10^4$ ohm.cm and the yield of the product was 80%. The results are summarized in the following Table II.

COMPARATIVE EXAMPLE 4

Electrically conductive zinc oxide powder was prepared according to the same procedure as in Example 1 except that the neutralization reaction was performed while maintaining the pH value of the reaction system at 5. The powder resistivity thereof was $6.7 \times 10^4$ ohm.cm and the yield thereof was 76%. In addition, the content of chlorine was 5.5%. The results are summarized below in Table II.

COMPARATIVE TABLE 5

Electrically conductive zinc oxide powder was prepared according to the same procedure as in Example 1 except that the temperature for calcining in a reducing atmosphere was established at 600° C. and at 700° C. Volatilization of zinc oxide due to reduction was caused and the yield thereof was less than 80% in each case.

The results are summarized below in Table IIa (see also Table II).

TABLE IIa

| Ex. No. | Calcination Temp. (°C.) | Powder Resistivity (ohm · cm) | Yield (%) | Color of the Product |
|---|---|---|---|---|
| 5-1 | 600 | $1.2 \times 10^1$ | 73 | dark gray |
| 5-2 | 700 | $1.2 \times 10^1$ | 60 | dark gray |

TABLE II
(Comparative Examples)

| Comparative Example No. | Zinc Compound | Alkali | Activator Combination | | Ratio of Addition | | Reaction System Temp. °C | pH | Drying Temp. °C |
|---|---|---|---|---|---|---|---|---|---|
| 1 | $ZnCl_3$ | $Na_2CO_3$ | $SnO_2$ | $Al_2O_3$ | | | 80 | | |
| 2 | " | " | $SnO_2/Al_2O_3/Ga_2O_3$ | | | | " | | 500 |
| 3 | " | $NH_4OH$ | — | $Al_2O_3$ | | | 100 | 8.2 | 100 |
| 4 | " | NaOH | $SnO_2$ | $Ga_2O_3$ | 0.593 | 0.545 | 60 | 5 | 105 |
| 5-1 | " | " | " | " | " | " | " | 10 | " |
| 5-2 | " | " | " | " | 0.005 | " | " | 10 | " |
| 6-1 | " | " | " | " | 0.010 | " | " | | " |
| 6-2 | " | " | " | " | 0.020 | " | " | | " |

COMPARATIVE EXAMPLE 6

Electrically conductive powders of zinc oxide were prepared according to the same procedure as in Example 1 except that an alkaline solution was added to a zinc salt solution in one portion or in a manner of gradual addition (or step by step addition). The results are summarized below in Table IIb (see also Table II).

TABLE IIb

| Ex. No. | Manner of addition | Powder Resistivity (ohm · cm) | Note |
|---|---|---|---|
| 6-1 | one portion addition | $2.0 \times 10^3$ | Cl content = 2.5% |
| 6-2 | gradual addition | $1.4 \times 10^3$ | |

What is claimed is:

1. A method for producing white, electrically conductive zinc oxide comprising
    simultaneously adding to a reactor (1) an aqueous solution containing both a water-soluble zinc compound and at least one water-soluble compound of a metal selected from the group consisting of tin, aluminum, gallium and indium, and (2) an aqueous alkaline solution in a manner effective to maintain the resulting neutralization reaction solution at a pH from 6 to 12.5 to obtain co-precipitates, then calcining said co-precipitates in a reducing atmosphere including hydrogen gas to obtain said conductive zinc oxide.

2. The method of claim 1 wherein one or more of the water-soluble metal compounds are present in the aqueous solution in an amount effective to form a coprecipitate selected from the group consisting of tin oxide, aluminum oxide, gallium oxide and indium oxide in the range from 0.005 to 5.0 parts by weight relative to zinc oxide.

3. The method of claim 2 wherein one or more of the water-soluble metal compounds are present in an amount effective to form a coprecipitate in the range from 0.005 to 2.0 parts by weight.

4. The method of claims 1, 2 or 3 wherein the pH of the resulting neutralization reaction solution is maintained from 7 to 12.

5. The method of claims 1, 2 or 3 wherein the calcination temperature ranges from 400° C. to 550° C.

6. The method of claim 5 wherein the calcination temperature ranges from 400° C. to 500° C.

7. The method of claim 5 further comprising the steps of washing the coprecipitates and then drying said coprecipitates at a temperature from 80° C. to 150° C. prior to calcining.

8. The method of claim 1 wherein the water-soluble zinc compound is selected from the group consisting of zinc sulfate, zinc chlorine, zinc nitrate, zinc acetate or a mixture thereof.

* * * * *

UNITED STATES PATENT AND TRADEMARK OFFICE
CERTIFICATE OF CORRECTION

PATENT NO. : 5,312,614
DATED : May 17, 1994
INVENTOR(S) : Hayashi et al.

It is certified that error appears in the above-indentified patent and that said Letters Patent is hereby corrected as shown below:

On the title page, item [73] please add the following:

Mitsui Mining & Smelting Co., Ltd.
        2-1-1, Nihonbashi-Muromachi, Chuo-ku
        Shinjuky-ku, Tokyo, Japan Signed and Sealed this Second Day of May, 1995

Attest:

BRUCE LEHMAN

*Attesting Officer*      *Commissioner of Patents and Trademarks*